United States Patent
Simonelic, II et al.

(10) Patent No.: US 11,907,184 B1
(45) Date of Patent: *Feb. 20, 2024

(54) COLLABORATIVE DATA MAPPING SYSTEM

(71) Applicant: Wells Fargo Bank, N.A., San Francisco, CA (US)

(72) Inventors: Kenneth J. Simonelic, II, Phoenix, AZ (US); Kathleen A. Leo, St. Paul, MN (US); Michael C. Cornish, Saint Charles, MO (US); Unnikrishnan R. Kaniattu, Charlotte, NC (US); Satya Manikonda, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/162,240

(22) Filed: Jan. 31, 2023

Related U.S. Application Data

(63) Continuation of application No. 16/533,126, filed on Aug. 6, 2019, now Pat. No. 11,593,322, which is a continuation of application No. 15/271,552, filed on Sep. 21, 2016, now Pat. No. 10,417,198.

(51) Int. Cl.
| | |
|---|---|
| *G06F 16/00* | (2019.01) |
| *G06F 16/21* | (2019.01) |
| *G06F 16/176* | (2019.01) |
| *G06F 16/248* | (2019.01) |
| *G06F 16/23* | (2019.01) |

(52) U.S. Cl.
CPC .......... *G06F 16/211* (2019.01); *G06F 16/176* (2019.01); *G06F 16/219* (2019.01); *G06F 16/2365* (2019.01); *G06F 16/248* (2019.01)

(58) Field of Classification Search
CPC .... G06F 16/211; G06F 16/176; G06F 16/219; G06F 16/2365; G06F 16/248
See application file for complete search history.

(56) References Cited

U.S. PATENT DOCUMENTS

| | | | |
|---|---|---|---|
| 5,767,854 A | 6/1998 | Anwar | |
| 6,144,962 A | 11/2000 | Weinberg et al. | |
| 7,003,694 B1 * | 2/2006 | Anderson, Jr. ..... | G06F 11/2023 714/16 |
| 7,103,619 B1 | 9/2006 | Rajpurkar et al. | |
| 7,546,286 B2 * | 6/2009 | Dickinson ............... | G06F 40/18 |

(Continued)

OTHER PUBLICATIONS

Abinitio, "A Credit Crisis," http://www.abinitio.com/en/applications/acreditcrisis, Retrieved on: Sep. 20, 2016, 2 pages.

(Continued)

*Primary Examiner* — Noosha Arjomandi
(74) *Attorney, Agent, or Firm* — Merchant & Gould P.C.

(57) ABSTRACT

A data mapping system provides a share, reusable and single mapping tool for mapping data and data lineage. The mapping system provides a version control functionality in the form of spreadsheet for tracking a plurality of mapping tasks that occur in parallel. The system allows multiple users to view the changes in mapping tasks, thereby improving data mapping visibility. Such visibility can significantly reduce conflicts between different mapping tasks that are independently performed by different teams or persons.

14 Claims, 16 Drawing Sheets

(56) References Cited

U.S. PATENT DOCUMENTS

| | | | |
|---|---|---|---|
| 8,176,019 | B2 | 5/2012 | Brodie et al. |
| 9,330,198 | B1 | 5/2016 | Campbell et al. |
| 9,740,831 | B2* | 8/2017 | Burns .................... G16H 10/20 |
| 10,417,198 | B1* | 9/2019 | Simonelic, II ........ G06F 16/176 |
| 10,540,404 | B1* | 1/2020 | Dang ............ G06Q 10/063116 |
| 2004/0093457 | A1* | 5/2004 | Heap .................. G06F 12/0607 |
| | | | 711/E12.079 |
| 2004/0172442 | A1* | 9/2004 | Ripley ............. G06F 16/90344 |
| | | | 709/200 |
| 2005/0086360 | A1 | 4/2005 | Mamou et al. |
| 2005/0182773 | A1* | 8/2005 | Feinsmith .............. G06Q 30/02 |
| 2005/0222931 | A1 | 10/2005 | Mamou et al. |
| 2006/0010180 | A1* | 1/2006 | Kawamura ......... G06F 11/2074 |
| | | | 714/E11.107 |
| 2006/0095447 | A1* | 5/2006 | Dickinson ............... G06F 40/18 |
| 2006/0293845 | A1 | 12/2006 | Watanabe |
| 2007/0022093 | A1 | 1/2007 | Wyatt et al. |
| 2009/0260060 | A1* | 10/2009 | Smith .................. H04L 63/105 |
| | | | 715/753 |
| 2009/0271418 | A1* | 10/2009 | Vaghani ............. G06F 11/1435 |
| | | | 707/E17.05 |
| 2009/0271562 | A1* | 10/2009 | Sinclair ............... G06F 12/0246 |
| | | | 711/E12.008 |
| 2009/0319544 | A1* | 12/2009 | Griffin ..................... G06F 16/25 |
| 2011/0179080 | A1 | 7/2011 | Miyazaki et al. |
| 2012/0143674 | A1* | 6/2012 | Ziskrout ............ G06Q 30/0244 |
| | | | 705/14.43 |
| 2013/0097177 | A1* | 4/2013 | Fan ....................... G06F 16/438 |
| | | | 707/805 |
| 2013/0173711 | A1* | 7/2013 | Pignatelli ........... G06Q 30/0276 |
| | | | 709/204 |
| 2014/0279942 | A1 | 9/2014 | Siepmann et al. |
| 2015/0134589 | A1* | 5/2015 | Marrelli ................ G06F 16/254 |
| | | | 707/602 |
| 2015/0242456 | A1 | 8/2015 | Cannon et al. |
| 2016/0234026 | A1* | 8/2016 | Wilkins ................... G06F 21/64 |
| 2016/0292206 | A1* | 10/2016 | Ruiz Velazquez .......................... |
| | | | G06F 3/04842 |
| 2016/0307445 | A1 | 10/2016 | Onozawa et al. |
| 2016/0314143 | A1* | 10/2016 | Hiroshige ............. G06F 16/254 |
| 2017/0212754 | A1* | 7/2017 | Green ........................ G06F 8/71 |
| 2017/0220654 | A1 | 8/2017 | De et al. |
| 2017/0235474 | A1* | 8/2017 | Armstrong .......... G06F 16/2379 |
| | | | 715/765 |
| 2017/0329461 | A1* | 11/2017 | Schikora ................ G06Q 10/10 |
| 2018/0055435 | A1* | 3/2018 | Macallum ................ G09B 5/02 |
| 2018/0150548 | A1 | 5/2018 | Shah et al. |
| 2018/0300324 | A1* | 10/2018 | Ziraknejad .............. H04W 4/02 |
| 2020/0104351 | A1* | 4/2020 | Pestoni ................ G06V 30/418 |
| 2021/0342785 | A1* | 11/2021 | Mann ...................... H04L 51/48 |

OTHER PUBLICATIONS

Abinitio, "A ReInsurer ReInvents," http://www.abinitio.com/en/applications/areinsurerreinvents, Retrieved on: Sep. 20, 2016, 2 pages.

Abinitio, "A Tale of Two Companies," http://www.abinitio.com/en/applications/ataleoftwocompanies, Retrieved on: Sep. 20, 2016, 2 pages.

Abinitio, "Ab Initio," http://www.abinitio.com/en/architecture/abinitioenterprisecomputingdoneright, Retrieved on: Sep. 20, 2016, 1 page.

Abinitio, "An Exchange Changes Directions," http://www.abinitio.com/en/applications/anexchangechanges, Retrieved on: Sep. 20, 2016, 2 pages.

Abinitio, "Better Isn't Boring," http://www.abinitio.com/en/applications/betterisntboring, Retrieved on: Sep. 20, 2016, 2 pages.

Abinitio, "Building a Better Mousetrap," http://www.abinitio.com/en/applications/buildingabettermousetrap, Retrieved on: Sep. 20, 2016, 2 pages.

Abinitio, "Business Rules Environment," http://www.abinitio.com/en/system/businessrulesenvironment, Retrieved on: Sep. 20, 2016, 6 pages.

Abinitio, "Conduct>It," http://www.abinitio.com/en/system/conductit, Retrieved on: Sep. 20, 2016, 5 pages.

Abinitio, "Continuous>Flows," http://www.abinitio.com/en/system/continuousflows, Retrieved on: Sep. 20, 2016, 5 pages.

Abinitio, "Data Quality," http://www.abinitio.com/en/architecture/dataquality, Retrieved on: Sep. 20, 2016, 1 page.

Abinitio, "Data Quality," http://www.abinitio.com/en/system/dataquality, Retrieved on: Sep. 20, 2016, 9 pages.

Abinitio, "Driving Change," http://www.abinitio.com/en/applications/drivingchange, Retrieved on: Sep. 20, 2016, 2 pages.

Abinitio, "Enterprise Meta>Environment," http://www.abinitio.com/en/system/enterprisemetaenvironment, Retrieved on: Sep. 20, 2016, 9 pages.

Abinitio, "Graphical," http://www.abinitio.com/en/architecture/graphical, Retrieved on: Sep. 20, 2016, 4 pages.

Abinitio, "Metadata," http://www.abinitio.com/en/architecture/metadata, Retrieved on: Sep. 20, 2016, 2 pages.

Abinitio, "Operational Management," http://www.abinitio.com/en/architecture/operationalmanagement, Retrieved on: Sep. 20, 2016, 2 pages.

Abinitio, "Out With the Old, In With the New," http://www.abinitio.com/en/applications/outwiththeold, Retrieved on: Sep. 20, 2016, 2 pages.

Abinitio, "Shock Therapy," http://www.abinitio.com/en/applications/shocktherapy, Retrieved on: Sep. 20, 2016, 2 pages.

Abinitio, "Show Me the Money," http://www.abinitio.com/en/applications/showmethemoney, Retrieved on: Sep. 20, 2016, 2 pages.

Abinitio, "Storing and Managing Big Data," http://www.abinitio.com/en/architecture/storingandmanagingbigdata, Retrieved on: Sep. 20, 2016, 1 page.

Abinitio, "Taking Flight," http://www.abinitio.com/en/applications/takingflight, Retrieved on: Sep. 20, 2016, 2 pages.

Abinitio, "The Co>Operating System," http://www.abinitio.com/en/architecture/thecooperatingsystem, Retrieved on: Sep. 20, 2016, 3 pages.

Abinitio, "The Co>Operating System," http://www.abinitio.com/en/system/thecooperatingsystem, Retrieved on: Sep. 20, 2016, 15 pages.

Abinitio, "The Right Stuff," http://www.abinitio.com/en/applications/therightstuff, Retrieved on: Sep. 20, 2016, 2 pages.

Abinitio, "This Old House," http://www.abinitio.com/en/applications/thisoldhouse, Retrieved on: Sep. 20, 2016, 2 pages.

Abinitio, "Time Tested," http://www.abinitio.com/en/applications/timetested, Retrieved on: Sep. 20, 2016, 2 pages.

Abinitio, "Trading Up," http://www.abinitio.com/en/applications/tradingup, Retrieved on: Sep. 20, 2016, 2 pages.

Abinitioworld, "what is Abinitio?," http://abinitioworld.blogspot.com/2012/04/whatisabinitio.html, Apr. 12, 2014, 3 pages.

ETL Tools, "Commercial ETL tools," http://www.etltools.net/abinitio.html, Retrieved on : Sep. 20, 2016, 2 pages.

Wikipedia, "Ab Initio Software," https://en.wikipedia.org/wiki/Ab_Initio_Software, Retrieved on: Sep. 20, 2016, 1 page.

* cited by examiner

FIG. 2

| Code Summ... | Description | Fields/Col... | Dataset | Business Term |
|---|---|---|---|---|
| for each item (unitprice * quantity) | | num_items | orders.xml | Quantity |
| | | quantity | orders.xml | Quantity |
| | | unitprice | orders.dat | Unit Price |
| rushamount/ 100.0 | convert cents into dollars | rushamount | orders.xml | Rush Charge A |
| join to edw.delzonepo stcodexref by deliveryzoneid | Join to DelZonePostC odeXref table in EDW to get the PostalCode | DELIVERYZO | delzonepost | Delivery Zone |
| | | ADDRESS | callcenter | Address Line 1 |
| | | ADDRESS | callcenter | Address Line 2 |
| | | ADDRESS | callcenter | Address Line 3 |
| lookup exchangerateid in edw.exchange rate by currency | Fetch the ExchangeRateID from the EDW using currency as the lookup key | currency | orders.xml | Currency Name |
| | | EXCHANGERATE | exchangerate | Exchange Rate |
| | | ADDRESS | callcenter | Address Line 1 |
| | | ADDRESS | callcenter | Address Line 2 |
| | | ADDRESS | callcenter | Address Line 3 |
| | | CALLCENT | callcenter | Call Center ID |
| | | MAINPHO | callcenter | Main Phone |
| | | MANAGER | callcenter | Manager ID |
| shipdate | this field is just passed through | enddate | orders.xml | End Date |
| customerid | this field is just passed | customerid | orders.xml | Customer ID |
| | | promotionid | orders.xml | Promotion ID |

Rule | Sources: Fields/Columns

▽ ▢ Sources
  ▽ ▦ callcenter
    ▦ ADDRESS1
    ▦ ADDRESS2
    ▦ ADDRESS3
    ▦ CALLCENTERID
    ▦ MAINPHONE
    ▦ MANAGERID
    ▦ NAME
  △ ▦ delzonepostcodexref
  △ ▦ employee
  △ ▦ exchangerate
  △ ◻ orders.dat
  △ ◻ orders.xml
△ ▢ Systems
△ ▢ Physical Assets

270

| Details ▾ for Mapping Spec🗐 APPR Mapping |||||||
|---|---|---|---|---|---|---|
| 📁 ⛓ ▦ \| 🔍 🖨 ▾ ❓ |||||||
| Info | Target Datasets | Source Datasets | Rules | Notes | Versions ||
| ✏ Edit  ▤ ▾ |||||||

- 272 → Info tab
- 280 → Edit
- 282 → Name: APPR Mapping
- 284 → Version: main
- 286 → Mapping Group: CMIE Common Subject Area
- Technical Specification: Versions
- ▾ Status
  - Mapping Status: Assigned
  - Mapping Editor: Mapping Editor Group
- 288 → Mapping Approver: Mapping Approver Group
  - Approval Status: Pending Approval
- Description
- Application System
- ▷ AUDIT PROPERTIES

Logged in as: Kathy Leo Change password Log out

Search... GO

290

| Approval Status | Audit Information | | | |
|---|---|---|---|---|
| | Created | | Last Modified | |
| | On Date | By Account | On Date | By Account |
| ⬡ Pending Approval | 2015/12/03 11:41 am (UTC-06:00) | Admin | 2015/12/03 11:41 am (UTC-06:00) | Admin |

| Business Term | Audit Information | | | |
| --- | --- | --- | --- | --- |
| | Created | | Last Modified | |
| | On Date | By Account | On Date | By Account |
| | | | | |
| | | | | |
| | | | | |
| | 2015/12/03 12:31 PM (UTC-06:00) | 👤 Mike Corn | 2015/12/03 12:31 PM (UTC-06:00) | 👤 Mike Corn |
| | | | | |
| | 2015/12/04 10:13 AM (UTC-06:00) | 👤 Mike Corn | 2015/12/04 12:30 PM (UTC-06:00) | 👤 Mike Corn |
| | 2015/12/03 12:31 PM (UTC-06:00) | 👤 Mike Corn | 2015/12/04 12:30 PM (UTC-06:00) | 👤 Mike Corn |
| | | | | |

FIG. 8

| Info | Columns | Keys | Business Term | Read by | Written by | Ultimate Sources | Disposition Lookups | Alert Specifications | Notes |
|------|---------|------|---------------|---------|------------|------------------|--------------------|--------------------|-------|

☐ Save ▽ | Apply | Cancel | ▽ Filters ☐ Modified rows only Changesets 1387 Mike Cornish-defualt-changeset Change...

| | Name | Data Model St... | Native Type | Business Term | Logical Attribute | Domain | Domain Code Set | Description |
|---|------|------------------|-------------|---------------|-------------------|--------|-----------------|-------------|
| 43 | MODE_LST_UPD | | | | | | | |
| 44 | CMIE_SOFT_DEL | | | | | | | |
| 45 | CMIE_PRG_IND | | | | | | | |
| 46 | HUD_APPR_ID | | | | | | | |
| 47 | APRSR_NM | | | | | | | |
| 48 | CMIE_LST_UPDT | | | | | | | |
| 49 | MIN_APPR_VLTN | | | | | | | |
| 50 | ADJ_APPR_RSN | | | | | | | |
| 51 | MODE_SRC_SYS | | | | | | | |
| 52 | CLNT_REF_JOB | | | | | | | |
| 53 | HVE_APPR_AGE | | | | | | | |
| 54 | RECRTFCN_VAL | | | | | | | |
| 55 | NEW_APPR_AMT | | | | | | | |
| 56 | APPR_TYPE_CD | | | | | | | |
| 57 | CRTE_BY_USR_I | | | | | | | |
| 58 | XFR_IN_APPR_ID | | | | | | | |
| 59 | AVM_SRC_VEND | | | | | | | |
| 60 | MODE_CREATED | | | | | | | |
| 61 | LST_UPDT_DTTM | | | | | | | |
| 62 | new_col-p | Provisional | | | | | | For code demand xyz |

FIG. 13

COLLABORATIVE DATA MAPPING SYSTEM

BACKGROUND

Data mapping is the process of creating data element mappings between two or more distinct data models. Data mapping can be used as a first step for data integration tasks including data transformation between a data source and a target, identification of data relationships as part of data lineage analysis, and consolidation of multiple databases into a single database. By way of example, a company that wants to transmit and receive purchases and invoices with other companies can use data mapping to create data maps from a company's data to standardized messages for items such as purchase orders and invoices.

A high volume of data typically involves multiple data analysts in different mapping tasks. When multiple mapping tasks are performed in parallel, collaboration between the data analysts is important to reduce or avoid mapping conflicts.

SUMMARY

In general terms, this disclosure is directed to a collaborative data mapping system. In one possible configuration and by non-limiting example, the data mapping system includes a data mapping enhancement system to improve visibility to mapping conflicts. Various aspects are described in this disclosure, which include, but are not limited to, the following aspects.

In one aspect, a method of mapping data includes: obtaining a mapping specification accessible in one or more mapping projects; enabling modification to at least one data element of the mapping specification in the mapping projects; determining whether the at least one data element is modified; and, in response to determining that the at least one data element is modified, providing a status indicator in the mapping specification, the status indicator being representative of the modification of the at least one data element.

In another aspect, a method for mapping data includes: generating a user interface configured to enable a user to create a data element (e.g., a logical data element); storing the data element in a temporary schema independent from a database schema; and enabling the user to associate the data element with one or more physical data elements in the database schema.

In yet another aspect, a method for mapping data includes: obtaining a plurality of versions of mapping specification; merging the plurality of versions of mapping specification to generate a master version of mapping specification; identifying a conflict between data elements in the master version of mapping specification based on one or more predetermined business rule; and generating an alert to the conflict.

BRIEF DESCRIPTION OF THE DRAWINGS

FIG. 2 illustrates an example user interface of an extraction, transformation, and loading (ETL) system.

FIG. 7A illustrates an example user interface for presenting mapping status information.

FIG. 7B illustrates another example user interface for presenting mapping status information.

FIG. 8 is an example user interface for presenting audit information.

FIG. 13 illustrates an example user interface for using a logical data element from the logical data table for mapping with physical data elements.

DETAILED DESCRIPTION

Figure 1:
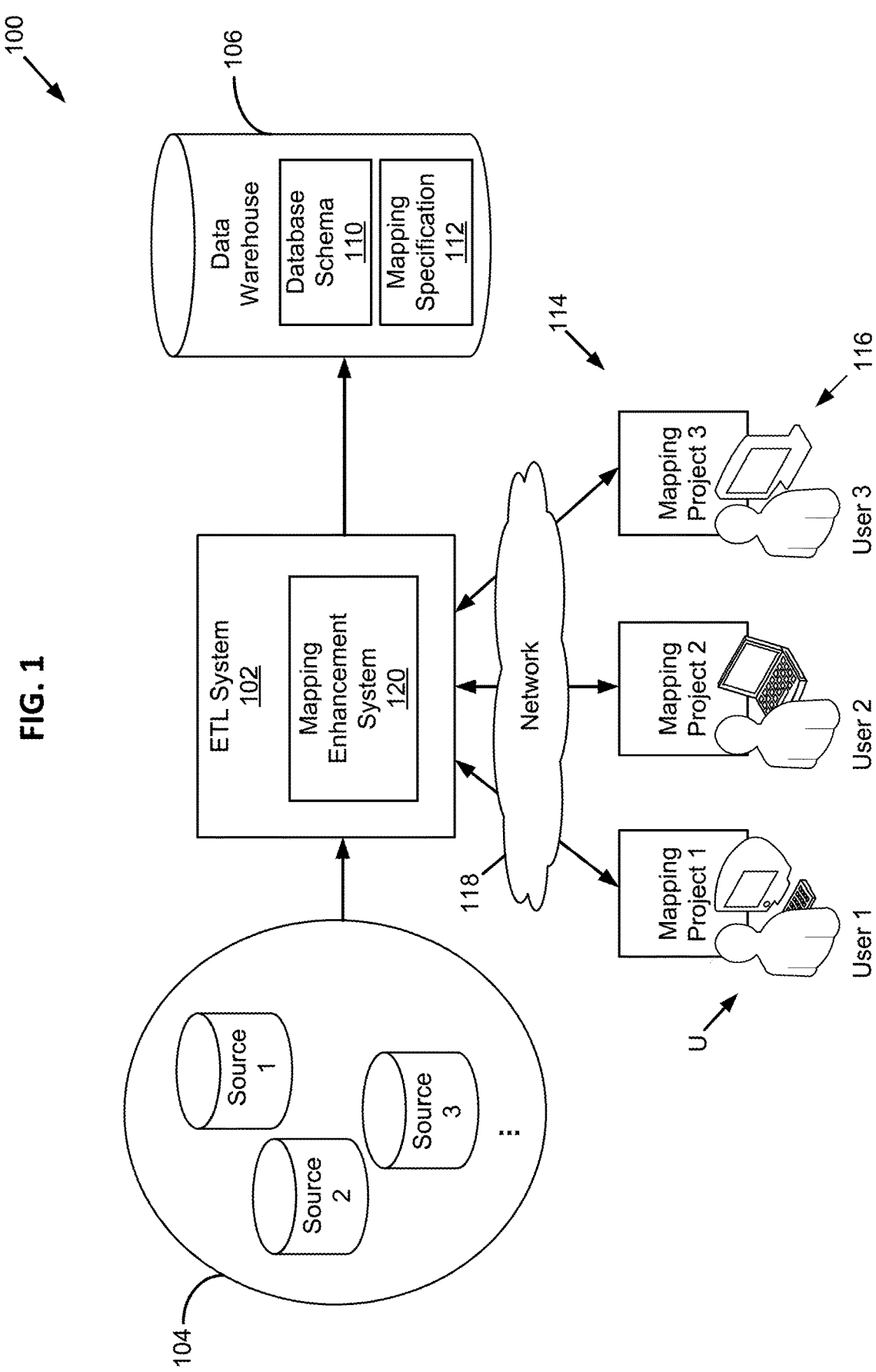
FIG. 1 illustrates an example system for mapping data.

Various embodiments will be described in detail with reference to the drawings, wherein like reference numerals represent like parts and assemblies throughout the several views.

In general, a mapping system in accordance with an exemplary embodiment of the present disclosure provides a shared, reusable and single mapping tool or mapping repository for data mapping and data lineage. The mapping system provides version control functionality for tracking a plurality of mapping tasks that occur in parallel. Where multiple teams or persons work on different mappings concurrently, the version control functionality of the mapping system improves visibility across different mapping releases. Such visibility can significantly reduce conflicts between different mapping tasks that are independently performed by different teams or persons.

For example, where one person makes a change in a mapping release, such a change is visible to other persons so that the persons can recognize the status of the mapping and work on their mapping projects to reduce mapping conflicts. As described herein, the mapping system can be implemented in the form of spreadsheet that makes it easy to perform mapping exercises.

FIG. 1 illustrates an example system 100 for mapping data. The data mapping system 100 includes an extraction, transformation, and loading (ETL) system 102 that operates to access and manipulate source data and load the data into target database. In some embodiments, the ETL system 102 is configured to first map data between various source systems 104 and a data warehouse 106. The ETL system 102 can then cleanse source data in staging area (i.e., a place where data is processed before entering the data warehouse), thereby resolving inconsistencies and fixing the anomalies in source data. Finally, the ETL system 102 can transform and load the cleansed source data into the data warehouse. Transformation of data includes manipulating data, such as cleansing, aggregating, and integrating data from multiple sources. The ETL system can also be referred to as an extraction, transformation, and transportation (ETT) or extraction, transformation, and move (ETM) system.

The source systems 104 include various databases, applications, files, or other storage facilities from which the data in the data warehouse is derived. The source systems 104 can be of different types and/or formats.

The data warehouse 106 is a centralized database management system configured to collects data from multiple heterogeneous source systems after applying transformation, standardization, and/or cleansing.

In some embodiments, the data warehouse 106 includes a database schema 110 and a mapping specification 112. In other embodiments, either or both of the database schema 110 and the mapping specification 112 are stored in one or more other databases.

The database schema 110 is a skeleton structure that represents the logical view of the entire data warehouse 106. The database schema 110 defines how the data is organized and how the relationships among them are associated. The database schema 110 can also formulate constraints that are to be applied on the data. The database schema 110 can define its entities and the relationship among them. The database schema 110 can also contain a descriptive detail of the data warehouse, which can be depicted by means of schema diagrams. As described herein, a database schema can generally have two categories: a physical database schema and a logical database schema. A physical database schema pertains to the actual storage of data and its form of storage such as files, indices, etc. A physical database schema defines how the data will be stored in a secondary storage. A logical database schema defines all the logical constraints that need to be applied on the data stored. A logical database schema defines tables, views, and integrity constraints.

The mapping specification 112 is a type of data dictionary that shows how data from one information system maps to data from another information system. A mapping specification can help users (e.g., developers, analysts, or project teams) avoid potential issues which can surface late in development or during user acceptance testing. In some embodiments, a mapping specification is useful in various projects, such as data migration (e.g., when source data is migrated to a new target data repository) and data integration (e.g., when source data is sent to a target data repository on a regular basis and the two data sources do not share a common data model). Further, the mapping specification 112 and the lineage it describes can be used in analytics, where an analyst is to learn about the relationship between one or more source applications and the data stored in the data warehouse.

Referring still to FIG. 1, the ETL system 102 is operated by a plurality of users U, such as developers, data analysts, mappers, and/or project teams, that can perform different mapping projects 114 via user computing devices 116. At least some of the mapping projects 114 can be independently performed by different users, but are associated and overlapped with each other.

The ETL system 102 can communicate with the user computing devices 116 via a data communication network 118. The data communication network 118 communicates digital data between one or more computing devices, such as between the ETL system 102 and the user computing devices 114. Examples of the network 118 include a local area network and a wide area network, such as the Internet. In some embodiments, the network 118 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

In some embodiments, the ETL system 102 includes a mapping enhancement system 120 that operates to improve the ETL system 102. As described below, the mapping enhancement system 120 provides a collaborative data mapping tool to enable mapping of logical or physical data elements and provide various mapping enhancing features, such as a shared, reusable, single source of truth (SSOT) device for mapping metadata and lineage, a version control device with approval capabilities and improved visibility across different mapping versions, and a mapping impact analysis device. The mapping enhancement system 120 is described with reference to FIG. 3.

FIG. 2 illustrates an example user interface 130 of the ETL system 102. In one possible embodiment, the user interface 130 of the ETL system 102 includes a spreadsheet 132 to describe data elements in a plurality of data fields. The user interface 130 provides spreadsheet-like functionality. For example, the user interface 130 allows drag and drop 134 of data elements, and multi-selection 136 of data elements.

The ETL system 102 can be built on various platforms. One example platform is available from Ab Initio Software, Lexington, Massachusetts, which provides a user friendly platform for data processing applications. Other platforms are also possible to develop the ETL system 102.

Figure 3:
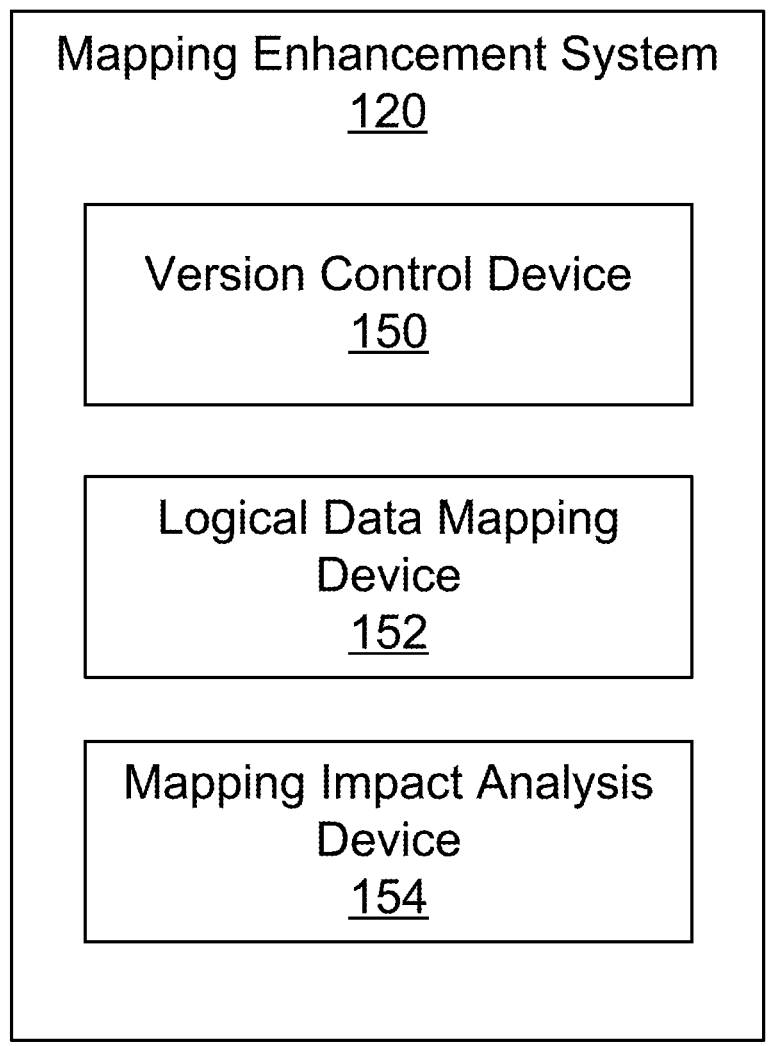
FIG. 3 is a block diagram of an example mapping enhancement system.

FIG. 3 is a block diagram of an example mapping enhancement system 120. In some embodiments, the mapping enhancement system 120 includes a version control device 150, a logical data mapping device 152, and a mapping impact analysis device 154.

The version control device 150 operates to track a plurality of mapping tasks that occur in parallel. For example, where multiple users work on different mapping projects concurrently (instead of working on projects in order), the version control device can improve visibility across such different mapping releases by tracking all the mapping tasks by different users and sharing the tracking history with all the users. Such visibility can significantly reduce conflicts between different mapping projects that different users independently perform. For example, where one user makes a change in a mapping specification, another user can readily see such a change and perform another mapping project, taking into account the previously-modified mapping specification. Such visibility can reduce an impact that one mapping project (e.g., on one version of mapping specification) can cause on a later mapping project (e.g., on another or later version of mapping specification).

As such, the version control device 150 improves visibility to various versions of mapping tasks that would be stored and was being worked on across multiple different users. By way of example, while two users U1 and U2 are concurrently working on different mapping projects that are dependent on each other, a first user U1 who is working on a first mapping project can access a second mapping project that a second user U2 is working on, or vice versa. Therefore, the users U1 and U2 can readily cooperate with each other to recognize and resolve any issue, such as conflicts, that may result from the first and/or second mapping projects. The first user need not wait to perform the first mapping project until the second user has completed the second mapping project on which the first mapping project depends. This can enhance collaboration between multiple users in multiple mapping projects.

Further, the version control device 150 can further provide status of mapping tasks including approval status of a particular version or release of mapping task (e.g., mapping specification) to improve visibility and collaboration.

The version control device 150 also provides audit trail information associated with multiple users. Such transparency or data legacy and lineage is also important to meet various regulations that require validity and accuracy in transferring data. For example, under the Real Estate Settlement Procedures Act (RESPA) and Truth in Lending Act (TILA) disclosures and regulations, financial institutes are required to be able to present data legacy and lineage to ensure authenticity and reliability in transformation of data across different systems.

Referring still to FIG. 3, the logical data mapping device 152 allows a user to create a data element (e.g., a logical data element) before creating a landing spot in the database, thereby providing flexibility and ability to continue mapping without stopping and waiting for someone else's mapping work. As such, mapping tasks can be performed more collaboratively among different users with the logical data mapping device 152. An example operation of the logical data mapping device 152 is described with reference to FIG. 9.

The mapping impact analysis device 154 operates to automatically identify potential conflicts between different versions of mapping tasks or mapping specifications, and evaluate whether such conflicts need to be resolved prior to further development. An example operation of the mapping impact analysis device 154 is described with reference to FIG. 14.

Figure 4:
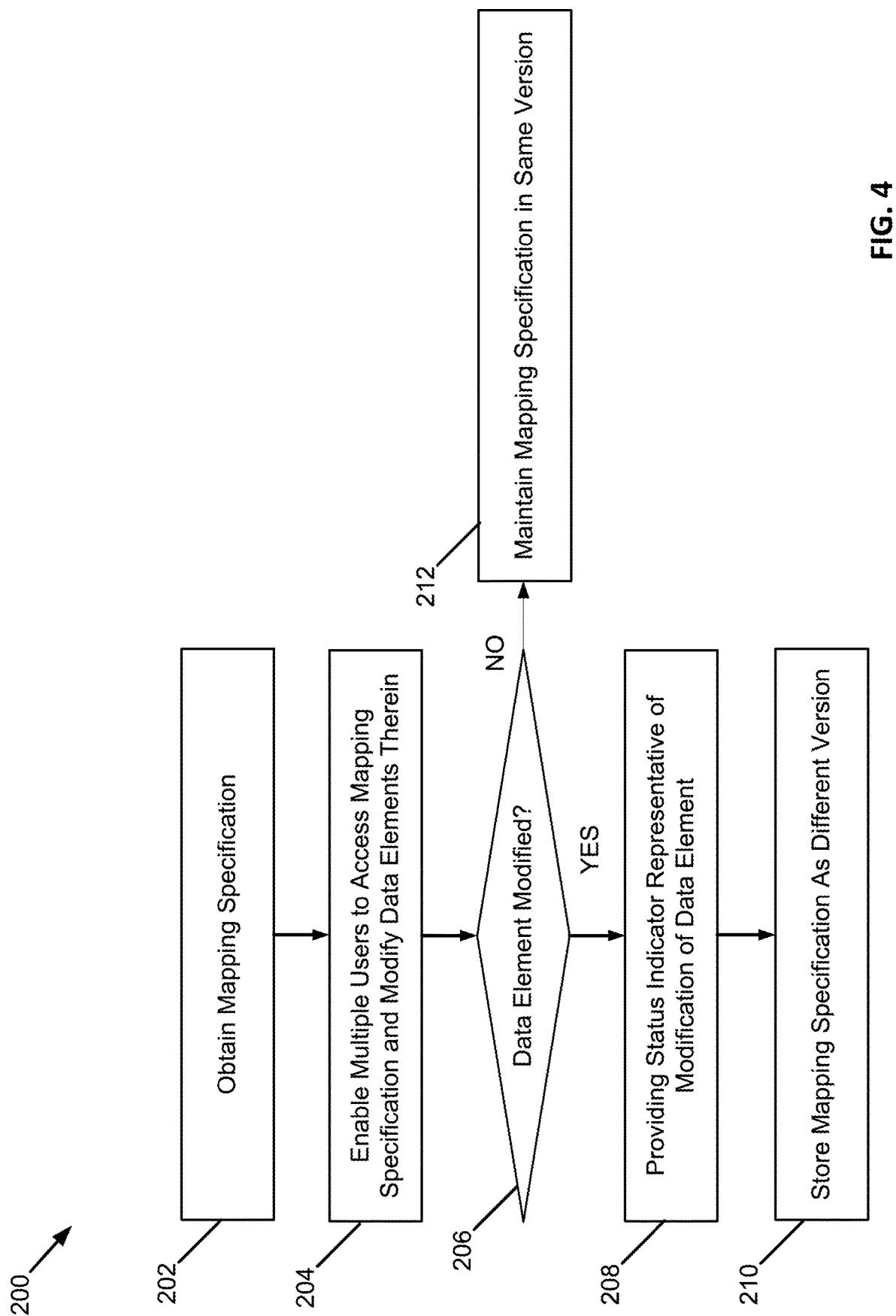
FIG. 4 is a flowchart illustrating an example method of operating a version control device.

FIG. 4 is a flowchart illustrating an example method 200 of operating the version control device 150. In this method, the version control device 150 operates to provide indication of changes made in mapping tasks so that users can easily recognize such changes in data element mapping.

In some embodiments, the method 200 begins at operation 202 in which the version control device 150 obtains a mapping specification 112. As described above, the mapping specification 112 can be generated using one or more computing devices, such as the ETL system 102, the user computing devices 116, or other computing devices.

At operation 204, the version control device 150 operates to enable the users to access the mapping specification and modify one or more data elements included in the mapping specification 112. The mapping specification is accessible by a plurality of users U that perform one or more mapping projects 114 using the user computing devices 116. The users can change data elements of the mapping specification 112 as part of performing their mapping projects 114.

In other embodiments, when performing their mapping projects 114, the users modify one or more data elements which are associated with the mapping specification. In this configuration, the users do not necessarily access and open the mapping specification to modify the data elements. However, such modified data elements can be automatically reflected and incorporated in the mapping specification 112 so that the users can recognize the modifications in the mapping specification 112.

At operation 206, the version control device 150 determines whether any of the data elements in the mapping specification has been modified. If it is determined that any data element has been modified ("YES" in this operation), the method moves on to operation 208. Otherwise ("NO" at this operation), the method continues at operation 212.

Figure 6:
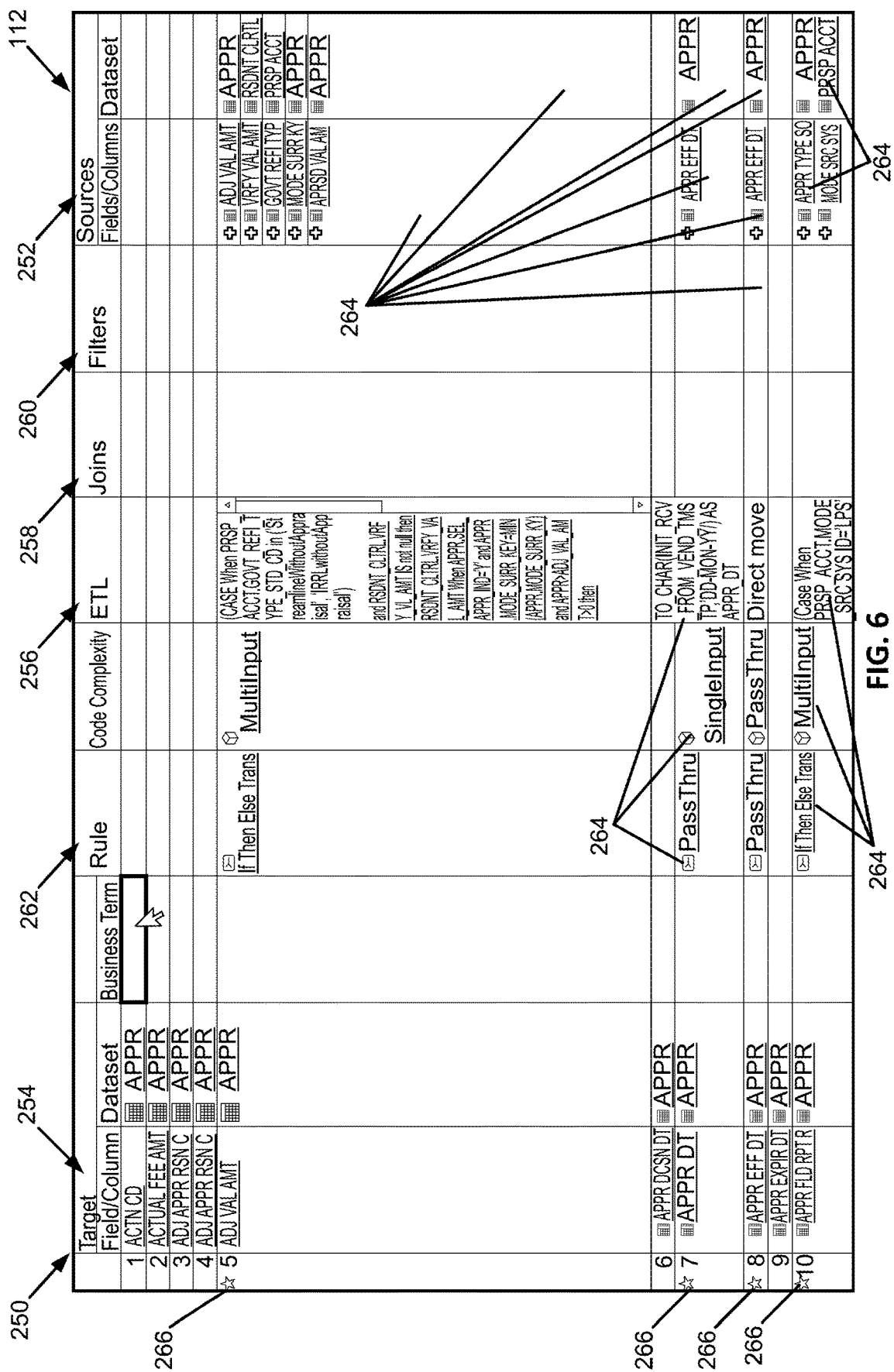
FIG. 6 is an example user interface of a mapping specification.

At operation 208, upon determining that a data element has been modified in the mapping specification, the version control device 150 provides a status indicator configured to represent that the data element has been modified. The status indicator can be designed in various ways. In one possible embodiment, the status indicator is generated by changing one or more graphical attribute of a data field associated with the modified data element. For example, as illustrated in FIG. 6, the data field for the modified data element is highlighted to have a different color than the other data fields with unmodified data elements. Alternatively, the text in the data field can have a different color than texts in the other data fields with unmodified data elements. In other embodiments, the status indicator includes other graphical user interface elements.

At operation 210, the version control device 150 operates to store the mapping specification 112 as a different version. By way of example, where a data element included in a first version of the mapping specification 112 has been modified, the version control device 150 creates a second version of the mapping specification 112 that reflects the modification of the data element. As described herein, the version control device 150 permits the users to see and access such different versions of mapping specification.

At operation 212, upon determining that no data element is modified, the version control device 150 operates to maintain the mapping specification in the same version. By way of example, where no data element included in a first version of the mapping specification 112 has been modified, the version control device 150 maintains the first version of the mapping specification 112.

Figure 5:
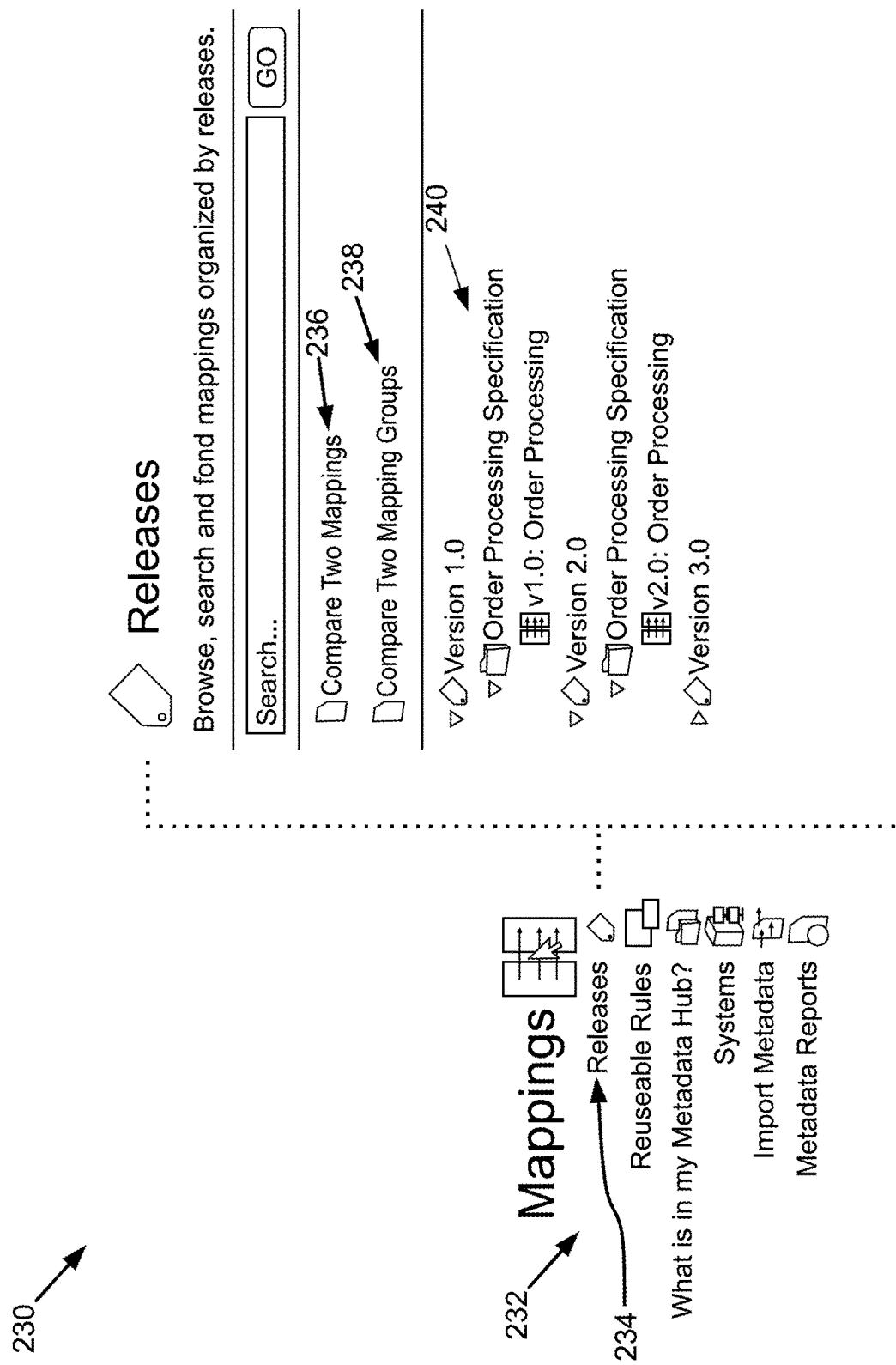
FIG. 5 is an example user interface of the version control device for comparing mappings and release versions.

FIG. 5 is an example user interface 230 of the version control device 150 for enabling users to compare mappings and release versions. With this interface, the version control device 150 enables users to access different versions of mapping or mapping specification. In one possible embodiment, the user interface 230 of the version control device 150 displays a menu 232 for selecting various options including a version compare option ("Releases") 234. Once the version compare option 234 is selected, a user can compare two or more mappings 236 or two or more mapping groups 238. In a subsection 240, the version control device 150 presents different versions of mapping or mapping specification so that a user can compare one or more of the versions and see the changes across the versions.

FIG. 6 is an example user interface 250 of the mapping specification 112 that is used in the ETL system 102 (e.g., the version control device 150). As described herein, the user interface of the version control device 150 can be configured as a spreadsheet with a plurality of columns and rows. In some embodiments, the user interface 250 shows source data information 252, target data information 254, an ETL column 256, a Joins column 258, a Filters column 260, a Rule column 262, and other relevant data fields. The source data information 252 and the target data information 254 can be expressed in field/column information, dataset information, and business term information. In some embodiments, the ETL column is used to insert mapping codes that define how to transform data. Such mapping codes can include computer program codes as in a query language such as SQL and other suitable languages. The Joins column is used to define a rule on how to connect two or more tables. The Filters column is used to filter data values, types, fields, and other elements based on business rules, such as those identified in the Rule column 262. In other embodiments, the user interface 250 can add any other suitable fields. The fields of the mapping specification are customizable to accommodate any necessary fields to achieve a predetermined mapping.

In some embodiments, at least some of the data elements in the fields can be hyperlinked to other sections, fields, sheets, windows, and/or user interfaces for additional information.

As described in FIG. 4, the version control device 150 operates to indicate any update or change in different versions (e.g., between two versions) of the mapping specification. In some embodiments, the version control device 150 operates to highlight data fields that contain data elements that have changed across different versions of the mapping specification. In FIG. 6, fields or cells 264 are highlighted in a different color (e.g., yellow) to indicate that there have been changes in the data elements of these fields. In some embodiments, a highlighted field is hyperlinked to an audit information table or section 270, as shown in FIGS. 7A and 7B.

In addition or alternatively, other types of indicators can be used to represent changes in data elements. For example, a distinctive mark 266, such as a colored star, can be placed adjacent a row number to indicate there is at least one field in that row that contains a modified data element.

FIGS. 7A and 7B illustrate an example user interface 270 for mapping status information. The mapping status information is presented via an independent page or window 272 (FIG. 7A) or in a portion or section of one or more spreadsheets 274 (FIG. 7B). The version control device 150 can provide the mapping status information to show the status of the mapping projects. With the mapping status information interface 270, the version control device 150 provides various pieces of information, such as information about a team or person working on a particular mapping project and an approval status of the mapping project.

In the illustrated example of FIG. 7A, the status information page 272 shows general information of the mapping specification, such as a mapping project name 280, a version 282, a mapping group 284, mapping status 286 including mapping approval status 288. In the example of FIG. 7B, the status information section 274 includes approval status 290 and various pieces of audit information 292, such as the date/time that a particular mapping specification was created and the account (or user identification) that is used to create the mapping specification, and the data/time that the mapping specification was recently modified and the account that was used for the recent modification.

In some embodiments, the user interface 270 generated by the version control device 150 is configured to receive a user input of approval of a version of the mapping specification. The version control device 150 can present the approval status differently depending on whether a user input of version approval has been received. In some examples, the version control device 150 authorizes only certain users to approve one or more certain versions of mapping specification. In other examples, all the users can be allowed to approve a version of mapping specification. In yet other examples, only one or more predetermined versions of mapping specification is subject to approval from one or more authorized users or all the users.

In some embodiments, the version control device 150 can limit some or all modifications of a particular version of mapping specification until a predetermined level of approval for the particular version of mapping specification is obtained.

FIG. 8 is an example user interface 300 for presenting audit information 302. In some embodiments, the audit information is included in one or more spreadsheet and presented using one or more fields or cells. The version control device 150 can operate to track and store all changes in the data elements associated with the mapping specification. The audit information table 302 includes various pieces of audit information, which can show a history of modification of the mapping specification or mapping tasks. Examples of the audit information include the date element (e.g., date and time) 304 that a particular mapping specification was created and the account (or user identification) 306 that is used to create the mapping specification, and the date element 308 that the mapping specification was recently modified and the account (or user identification) 310 that was used for the recent modification. Other examples of the audit information include a date that a data element was created, a user that created the data element, a date that the data element was recently modified, and a user that recently modified the data element. As such, the version control device provides audit trails, thereby improving auditability of mapping processes. In some examples, the audit information can remain available for a predetermined period of time even on data elements that have been deprecated or removed from the physical or logical schema, in order to satisfy regulator or other historical data analysis requirements.

As discussed with reference to FIGS. 4-8, the version control device of the mapping system provides the mapping specification that is accessible by multiple users who perform different mapping projects, and shows any changes between different versions of the mapping specification. In this way, the version control device improves visibility to the mapping progress and allows the multiple users to immediately appreciate any update or progress in the different mapping projects by other users and collaborate with them. The multiple users can work at the same time while monitoring some of the mapping projects in progress that may affect the other mapping projects.

Figure 9:
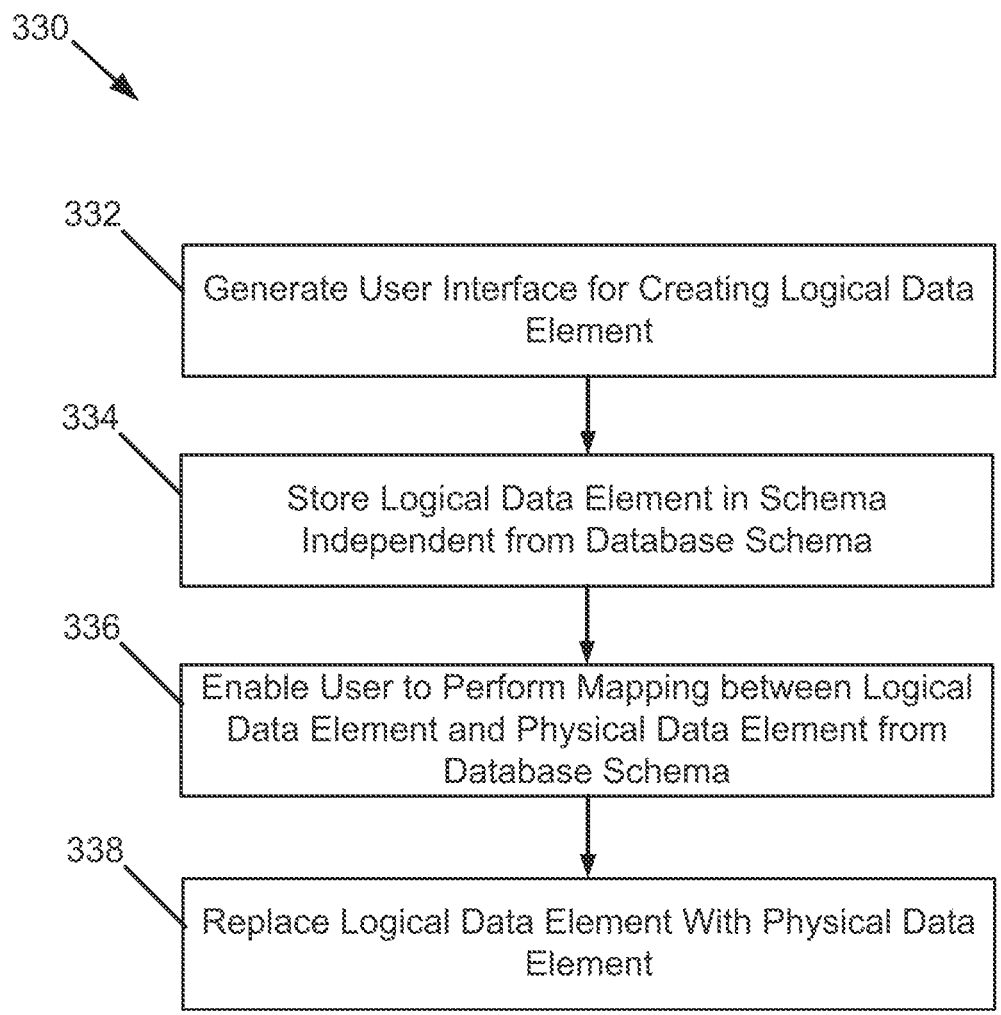
FIG. 9 is a flowchart illustrating an example method for operating a logical data mapping device.

FIG. 9 is a flowchart illustrating an example method 330 for operating the logical data mapping device 152. In general, the logical data mapping device 152 enables users to perform mapping of a data element (e.g., a logical data element) without creating any landing spot for the data element. For example, the logical data mapping device 152 operates to enable a user to describe, and map to, a data element before providing physical connection to a database schema.

The logical data mapping device 152 can allow proceeding with mapping of a logical data element and return later to creating a physical data element corresponding to the logical data element without looking track of the logical data element.

In general, a physical data element is a data element that meets all facilities and constraints of a given database management system. In some embodiments, a physical data element can derive from a logical data element. A physical data element can include all the database artifacts required to create relationships between tables or to achieve performance goals, such as indexes, constraint definitions, linking tables, partitioned tables or clusters. For example, a physical data element has a place to land in a database. A logical data element is a data element that does not currently exist in any database yet, but needs to map. Once a physical place (e.g., a table column) is created, the logical data element is mapped to a physical element. For example, the logical data element can become a physical data element by remapping the logical data element to the physical place.

The method 330 can begin at operation 332 in which the logical data mapping device 152 operates to generate a user interface configured to enable a user to create a logical data element. At operation 334, the logical data mapping device 152 operates to store the logical data element in a temporary schema independent from a database schema. At operation 336, the logical data mapping device 152 enables the user to associate the data element with one or more physical data elements in the database schema. For example, the user can perform mapping between the created logical data element and one or more physical data elements from the database schema, so that the logical data element is mapped to the one or more physical data elements. In some embodiments, in addition to the operations above, the logical data mapping device 152 can allow replacing the logical data element with a physical data element (at operation 338).

Figure 10:
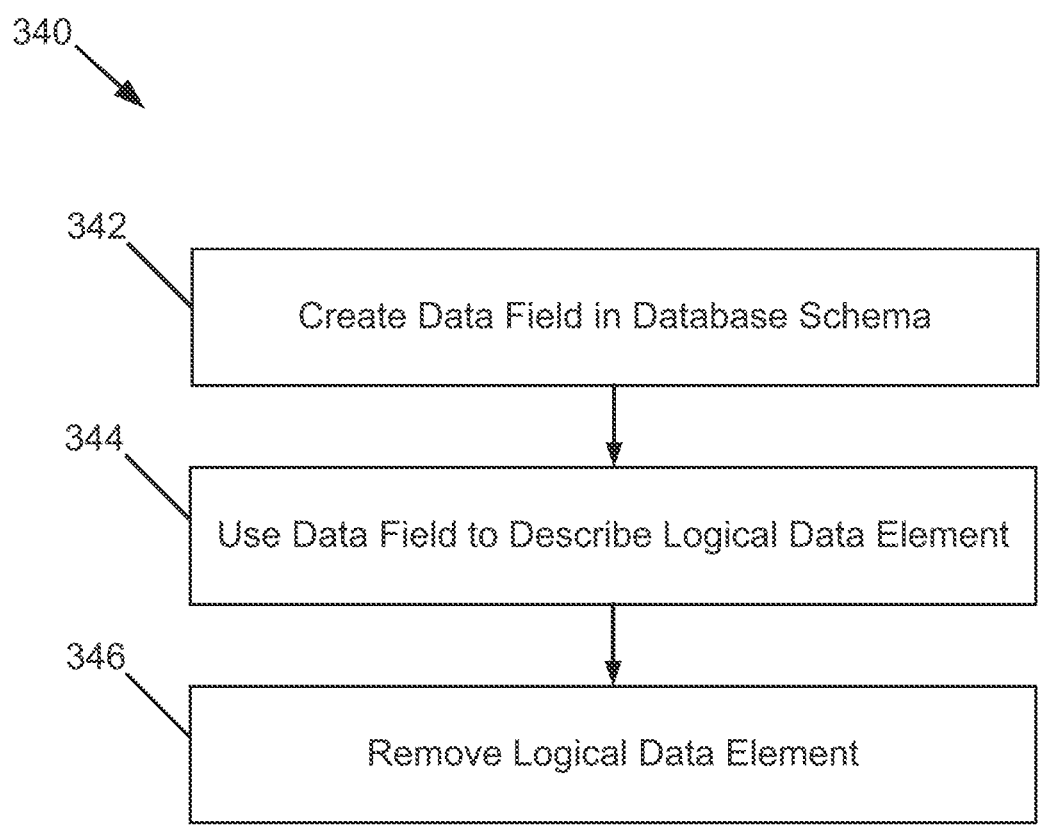
FIG. 10 is a flowchart illustrating an example method for replacing a logical data element with a physical data element.

FIG. 10 is a flowchart illustrating an example method 340 for replacing a logical data element with a physical data element, as in the operation 338 of FIG. 9. In some embodiments, the user can create one or more data fields in the database schema (at operation 342), and use the data fields to describe the logical data element (at operation 344). For example, at operation 344, the user can associate the logical data element with the data fields in the database schema, thereby turning the logical data element into a physical data element. In some embodiments, the user can then remove the logical data element in the temporary schema (at operation 346).

Figure 11:
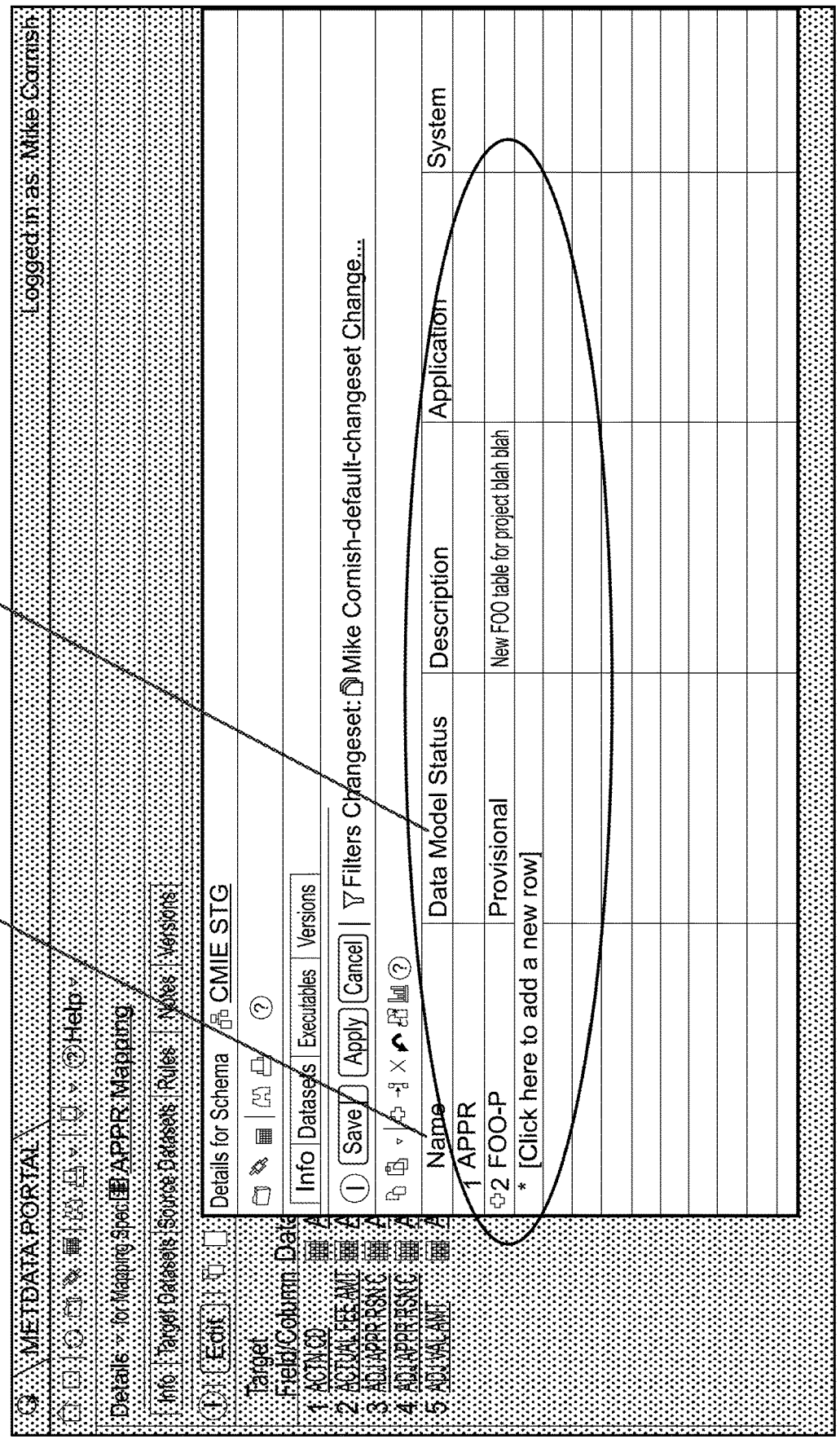
FIG. 11 illustrates an example user interface of the logical data mapping device for mapping a logical data table where no physical data table exists.
Figure 12:
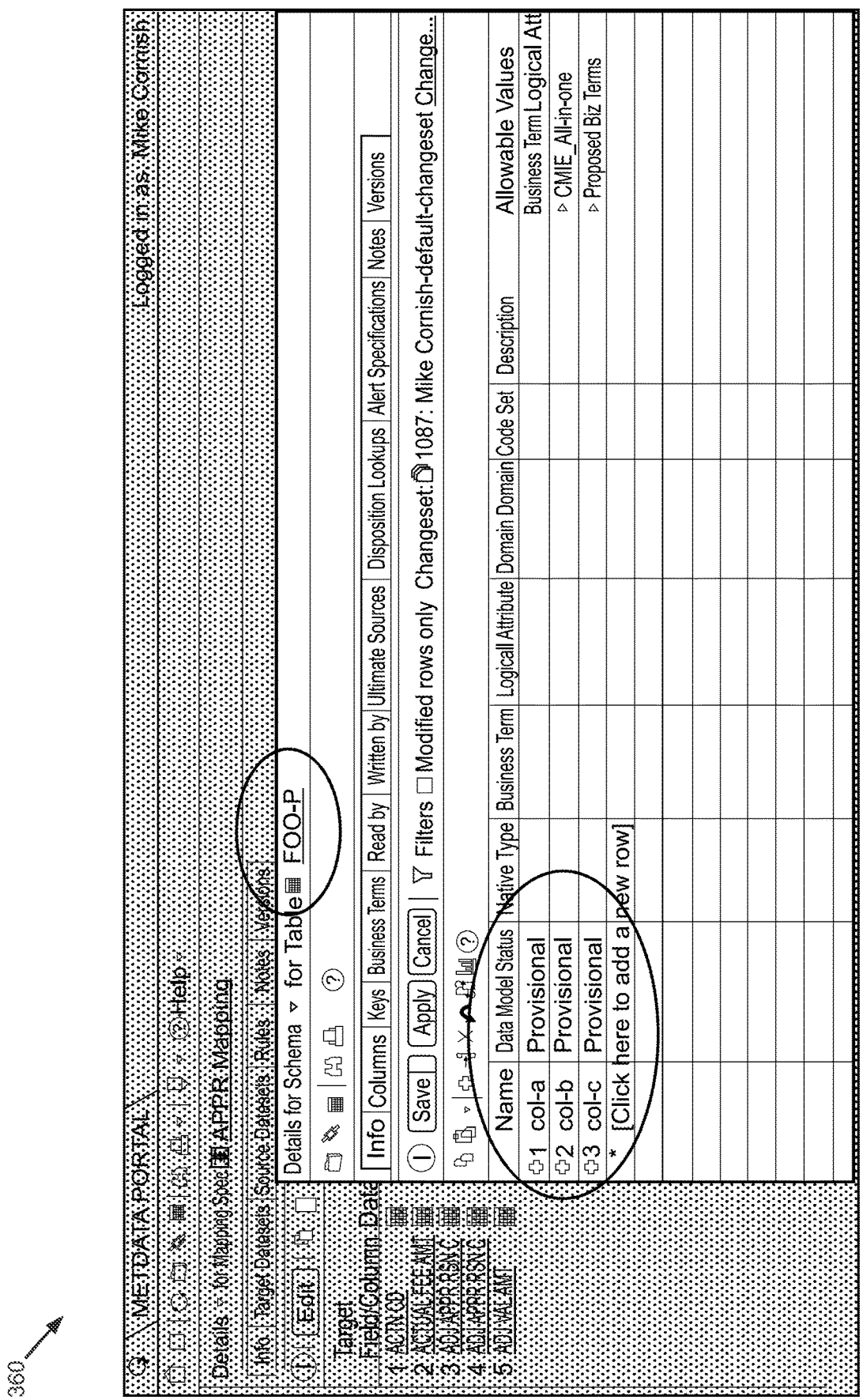
FIG. 12 illustrates an example user interface for adding data fields to the logical data table without a physical data table.

Referring to FIGS. 11-13, example user interfaces of the logical data mapping device 152 are described. FIG. 11 illustrates an example user interface 350 of the logical data mapping device 152 for mapping a logical data table where no physical data table exists. The user interface 350 is configured to receive a user input of creating a logical data table (with a name 352 of "FOO-P" in FIG. 11). In some embodiments, the user interface 350 is also used to present existing physical data elements or to create physical data elements. With the user interface 350, a user can conveniently create a logical data element in the same way as the user would do for a physical data element. When creating a data element, for example, the user can simply categorize it as a logical data element, such as by indicating or selecting "Provisional" in the Data Model Status 354 in FIG. 11. FIG. 12 illustrates an example user interface 360 for adding columns to the logical data table without a physical data table. In the illustrated example, a user can add columns or rows on the logical data table ("FOO-P") via the interface 360. FIG. 13 illustrates an example user interface 364 for using a logical data element 366 from the logical data table for mapping with physical data elements 368.

Figure 14:
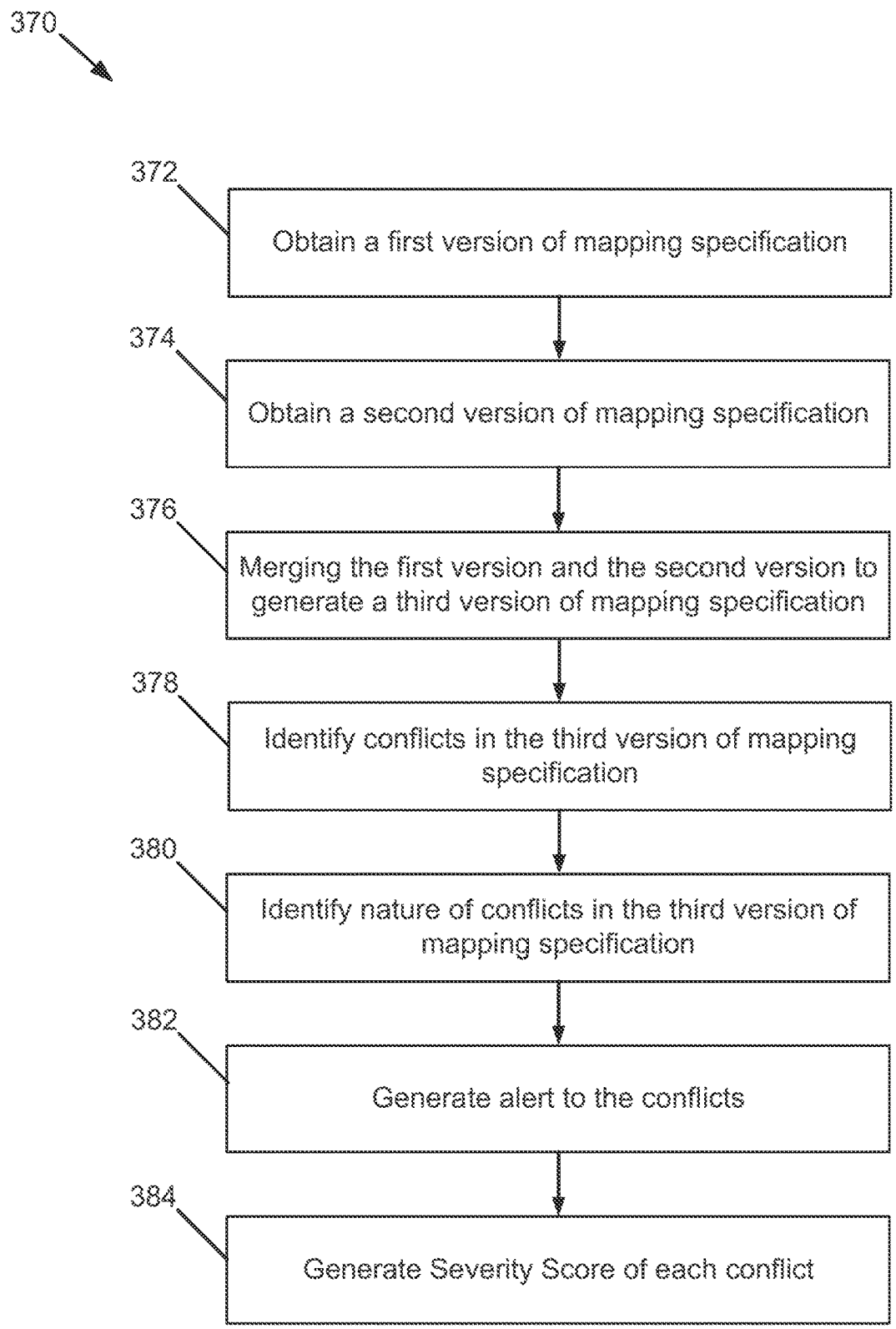
FIG. 14 is a flowchart illustrating an example method of operating a mapping impact analysis device.

FIG. 14 is a flowchart illustrating an example method 370 of operating the mapping impact analysis device 154. As described herein, the mapping impact analysis device 154 operates to automatically identify potential conflicts between different versions of mapping specification, and evaluate a significance of impact of one version (a previous version) of mapping specification on another version (a subsequent or later version) of the mapping specification. The mapping impact analysis device 154 can further operate to merge different versions of mapping tasks or mapping specifications while automatically resolving conflicts between the versions.

In general, the mapping impact analysis device 154 can obtain a plurality of versions of mapping specification, merge the plurality of versions of mapping specification to generate a master version of mapping specification, and identify a conflict between data elements in the master version of mapping specification based on one or more predetermined business rules. In some embodiments, the mapping impact analysis device 154 can generate an alert to the conflict. The mapping impact analysis device 154 can further identify the nature of the conflict between the data elements in the master version of mapping specification. In addition, the mapping impact analysis device 154 can generate a severity score of the conflict, which can be used to evaluate the significance of the conflict.

Referring to FIG. 14, in some embodiments, the method 370 begins at operation 372 in which the mapping impact analysis device 154 obtains a first version of mapping specification. Then, the mapping impact analysis device 154 obtains a second version of mapping specification (at operation 374), and merges the first and second versions of mapping specification to generate a third version (i.e., a master version) of mapping specification (at operation 376). In some embodiments, the second version of mapping specification can be a modified version of the first version of mapping specification. In some embodiments, predetermined business rules can be used and referred to in merging the first and second versions of mapping specification.

At operation 378, the mapping impact analysis device 154 operates to identify one or more conflicts in the third version of mapping specification. At operation 380, the mapping impact analysis device 154 can further identify the nature of such conflicts in the third version of mapping specification.

At operation 382, the mapping impact analysis device 154 can generate an alert to the conflicts. The alert can be of various types, such as visible and/or audible notifications using the ETL system 102 and/or the user computing devices 116. Another example is an email or text notification to the affected users.

At operation 384, the mapping impact analysis device 154 can further generates a severity score for each conflict to quantify the impact of the conflict on the mapping. The severity score can determine whether to fix the identified conflict.

Figure 15:
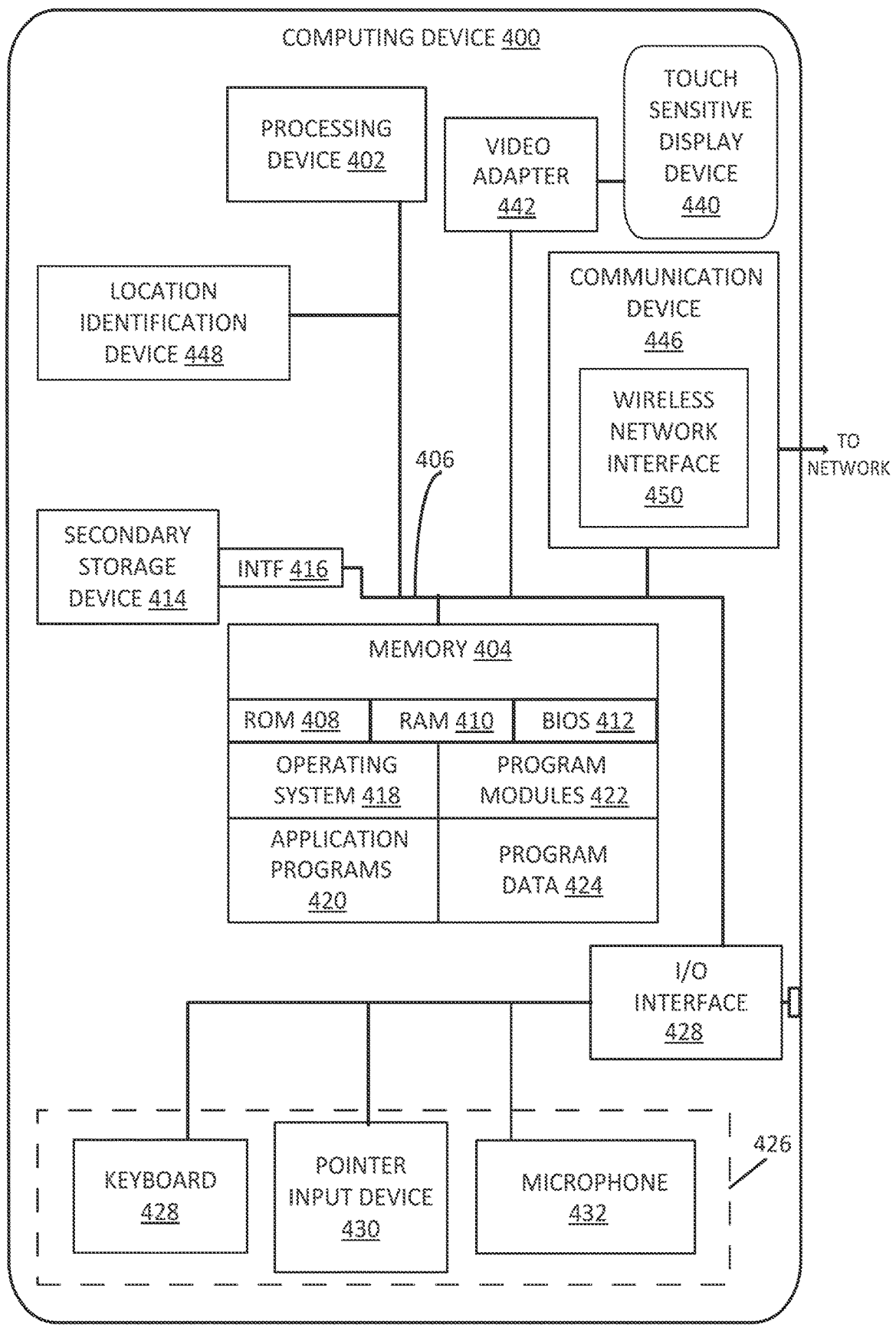
FIG. 15 illustrates an exemplary architecture of a computing device which can be used in the data mapping system of the present disclosure.

FIG. 15 illustrates an exemplary architecture of a computing device 400 which can be used in the data mapping system 100 of the present disclosure. The computing device 400 illustrated in FIG. 15 is used to execute the operating system, application programs, and software modules (including the software engines) described herein.

The computing device 400 can be of various types. In some embodiments, the computing device 400 is a desktop computer, a laptop computer, or other devices configured to process digital instructions. In other embodiments, the computing device 400 is a mobile computing device. Examples of the computing device 400 as a mobile computing device include a mobile device (e.g., a smart phone and a tablet computer), a wearable computer (e.g., a smartwatch and a head-mounted display), a personal digital assistant (PDA), a handheld game console, a portable media player, an ultra-mobile PC, a digital still camera, a digital video camera, and other mobile devices.

It is recognized that the architecture illustrated in FIG. 15 can also be implemented in various computing devices used to achieve aspects of the present disclosure. For example, the ETL system 102, the user computing devices 116, and other computing devices associated with the data sources 104 and the data warehouse 106 can be configured similarly to the architecture of FIG. 15. To avoid undue repetition, this description of the computing device 400 will not be separately repeated herein for each of the other computing devices in the data mapping system 100.

The computing device 400 includes, in some embodiments, at least one processing device 402, such as a central processing unit (CPU). A variety of processing devices are available from a variety of manufacturers, for example, Intel or Advanced Micro Devices. In this example, the computing device 400 also includes a system memory 404, and a system bus 406 that couples various system components including the system memory 404 to the processing device 402. The system bus 406 is one of any number of types of bus structures including a memory bus, or memory controller; a peripheral bus; and a local bus using any of a variety of bus architectures.

The system memory 404 includes read only memory 408 and random access memory 410. A basic input/output system 412 containing the basic routines that act to transfer information within the computing device 400, such as during start up, is typically stored in the read only memory 408.

The computing device 400 also includes a secondary storage device 414 in some embodiments, such as a hard disk drive, for storing digital data. The secondary storage device 414 is connected to the system bus 406 by a secondary storage interface 416. The secondary storage devices and their associated computer readable media provide nonvolatile storage of computer readable instructions (including application programs and program modules), data structures, and other data for the computing device 400.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 414 or memory 404, including an operating system 418, one or more application programs 420, other program modules 422, and program data 424.

In some embodiments, the computing device 400 includes input devices to enable a user to provide inputs to the computing device 400. Examples of input devices 426 include a keyboard 428, a pointer input device 430, a microphone 432, and a touch sensitive display 440. Other embodiments include other input devices. The input devices are often connected to the processing device 402 through an input/output interface 438 that is coupled to the system bus 406. These input devices 426 can be connected by any number of input/output interfaces, such as a parallel port, serial port, game port, or a universal serial bus. Wireless communication between input devices and interface 438 is possible as well, and includes infrared, BLUETOOTH® wireless technology, 802.11 a/b/g/n, cellular, or other radio frequency communication systems in some possible embodiments.

In this example embodiment, a touch sensitive display device 440 is also connected to the system bus 406 via an interface, such as a video adapter 442. The touch sensitive display device 440 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 440, the computing device 400 can include various other peripheral devices (not shown), such as speakers or a printer.

The computing device 400 further includes a communication device 446 configured to establish communication across the network. In some embodiments, when used in a local area networking environment or a wide area networking environment (such as the Internet), the computing device 400 is typically connected to the network through a network interface, such as a wireless network interface 450. Other possible embodiments use other wired and/or wireless communication devices. For example, some embodiments of the computing device 400 include an Ethernet network interface, or a modem for communicating across the network. In yet other embodiments, the communication device 446 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The computing device 400 typically includes at least some form of computer-readable media. Computer readable media includes any available media that can be accessed by the computing device 400. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 400. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 15 is also an example of programmable electronics, which may include one or more such computing devices, and when multiple computing devices are included, such computing devices can be coupled together with a suitable data communication network so as to collectively perform the various functions, methods, or operations disclosed herein.

Referring again to FIG. 15, the computing device 400 can include a location identification device 448. The location identification device 448 is configured to identify the location or geolocation of the computing device 400. The location identification device 448 can use various types of geolocating or positioning systems, such as network-based systems, handset-based systems, SIM-based systems, Wi-Fi positioning systems, and hybrid positioning systems. Network-based systems utilize service provider's network infrastructure, such as cell tower triangulation. Handset-based systems typically use the Global Positioning System (GPS). Wi-Fi positioning systems can be used when GPS is inadequate due to various causes including multipath and signal blockage indoors. Hybrid positioning systems use a combination of network-based and handset-based technologies for location determination, such as Assisted GPS.

As described herein, the data mapping system in accordance with the present disclosure provides a spreadsheet-like functionality and format, which includes several user-friendly features, such as drag-and-drop and multi-select mapping. The system further provides a mapping review and approval workflow such that multiple users and entities, such as business teams, technical teams, stakeholders, approvers, and testers, can review and approve the mapping tasks. The system also provides audit and tracking history.

The system improves collaboration between multiple users by allowing them to review, update, view changes in a queue. The system also supports view of multiple mapping streams, and provides visibility to multiple teams that perform mapping on separate projects and referencing the same elements across development, test, and production environments.

Further, the system provides ability to map both physical and logical data elements.

In addition, the system has import and export capabilities so that metadata and lineage for mappings can be imported from existing spreadsheets, thereby avoiding manual re-entry. The system can provide a single source of shared end-to-end lineage and integrate with the metadata hub for visibility to lineage across systems and to facilitate reuse. The system enables users to see source-to-target lineage from a screen for report.

The system improves versioning by allowing users to view changes across releases, across projects, or across development, test and production environments. The system also shows a list of attributes that changes in a given release, project, or timeframe. The system provides indication (e.g., highlighting) showing data changes that result in conflicts with development or production.

Accordingly, the system of the present disclosure solves multiple problems that can be created when using spreadsheets for source-to-target mapping as part of data development life cycle. Typical spreadsheets can create multiple, siloed versions of data mapping information without permitting versioning, reuse, or sharing, and, therefore, can result in disparate information regarding data flows during key development phases and also cause repeated rework and duplication. The system of the present disclosure provides collaborative mapping and improves visibility to different mapping releases.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method for mapping data, the method comprising:
   obtaining, by a computing device, a plurality of versions of a mapping specification, the mapping specification describing how data from a source information system maps to a destination information system;
   merging, by the computing device, the plurality of versions of the mapping specification to generate a master version of the mapping specification, wherein the master version of the mapping specification is created by merging a first version of the plurality of versions of the mapping specification with a second version of the plurality of versions of the mapping specification;
   identifying, by the computing device, any conflicts between data elements in the master version of the mapping specification based on one or more predetermined business rules;
   generating, by the computing device, a severity score of the conflicts, wherein the severity score indicates a significance of the conflicts and whether the conflicts should be fixed; and
   generating, by the computing device, an alert based upon the conflicts.

2. The method of claim 1, further comprising identifying a nature of the conflicts between the data elements in the master version of the mapping specification.

3. The method of claim 1, wherein obtaining the plurality of versions includes:
   obtaining the first version associated with a first mapping project of a first user; and
   obtaining the second version associated with a second mapping project of a second user.

4. The method of claim 1, further comprising generating a user interface including information on the mapping specification.

5. The method of claim 4, wherein the user interface includes a rule column listing the one or more predetermined business rules.

6. The method of claim 5, wherein the user interface includes a filters column programmed to filter data values.

7. The method of claim 6, wherein the filter data values are based on types, fields, and other elements based on business rules.

8. A system for mapping data, the system comprising:
   a processor; and
   memory encoding instructions which, when executed by the processor, causes the system to:
      obtain, by the processor, a plurality of versions of a mapping specification, the mapping specification describing how data from a source information system maps to a destination information system;
      merge, by the processor, the plurality of versions of the mapping specification to generate a master version of the mapping specification, wherein the master version of the mapping specification is created by merging a first version of the plurality of versions of the mapping specification with a second version of the plurality of versions of the mapping specification;

identify, by the processor, any conflicts between data elements in the master version of the mapping specification based on one or more predetermined business rules;

generate, by the processor, a severity score of the conflicts, wherein the severity score indicates a significance of the conflicts and whether the conflicts should be fixed; and generate, by the processor, an alert based upon the conflicts.

9. The system of claim 8, comprising further instructions which, when executed by the processor, causes the system to identify a nature of the conflicts between the data elements in the master version of the mapping specification.

10. The system of claim 8, wherein to obtain the plurality of versions includes to:

obtain the first version associated with a first mapping project of a first user; and obtain the second version associated with a second mapping project of a second user.

11. The system of claim 8, comprising further instructions which, when executed by the processor, causes the system to generate a user interface including information on the mapping specification.

12. The system of claim 11, wherein the user interface includes a rule column listing the one or more predetermined business rules.

13. The system of claim 12, wherein the user interface includes a filters column programmed to filter data values.

14. The system of claim 13, wherein the filter data values are based on types, fields, and other elements based on business rules.

* * * * *